Oct. 16, 1934.　　A. A. HOLBECK　　1,977,513
FEEDER
Filed Nov. 19, 1931
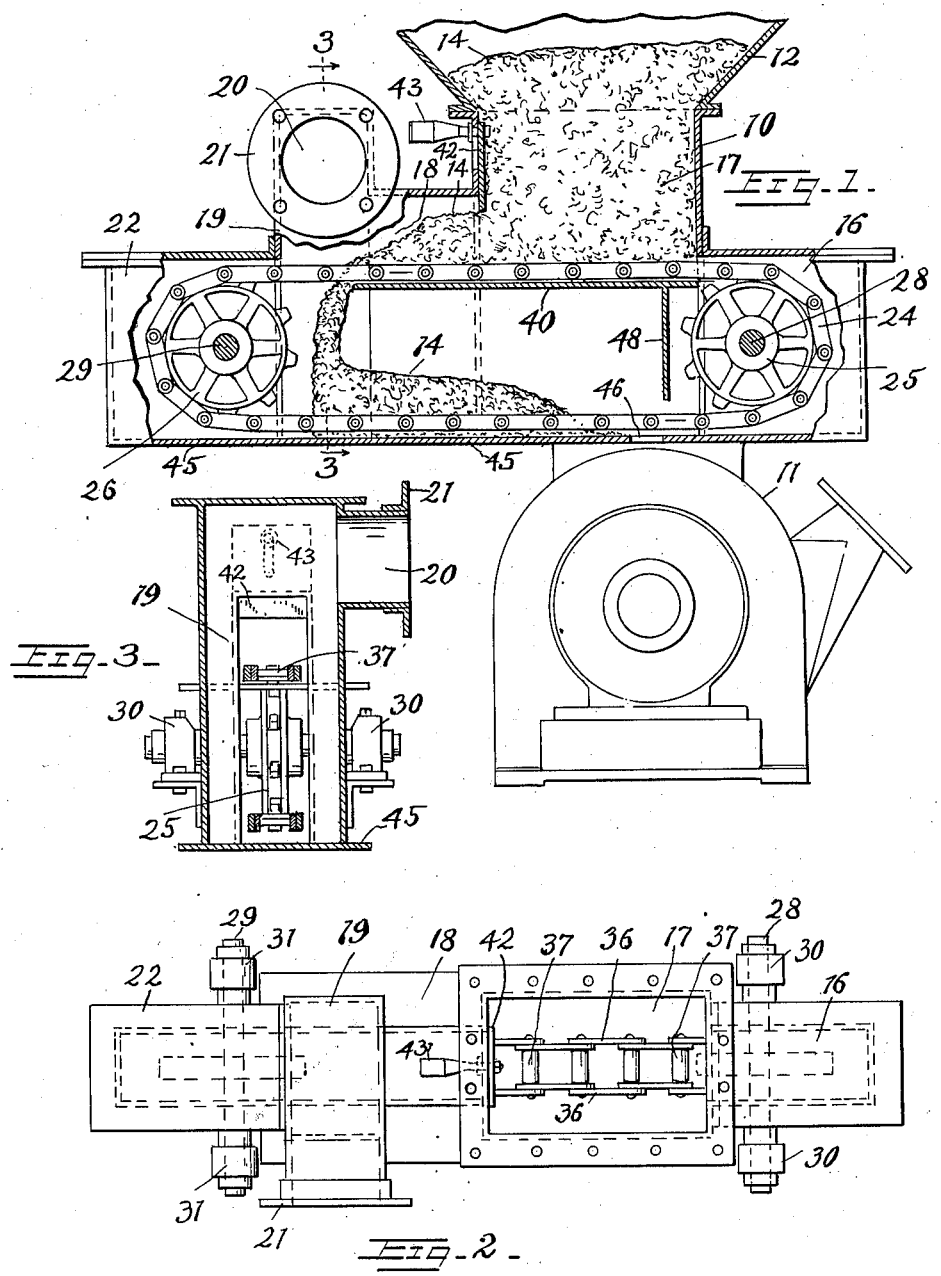
INVENTOR:
AUSTIN A. HOLBECK.
Kwis Hudson & Kent
ATTORNEYS.

Patented Oct. 16, 1934

1,977,513

UNITED STATES PATENT OFFICE 1,977,513

FEEDER

Austin A. Holbeck, Lakewood, Ohio

Application November 19, 1931, Serial No. 576,073

2 Claims. (Cl. 83—44)

This invention relates to a feeding mechanism and is of a type adapted to feed coal, grain, flour or powdered material.

It is one of the objects of the present invention to provide a feeding mechanism which will insure the feeding of a steady, uniform and continuous supply of material.

A further object of the present invention is to provide a feeder in which the material is dried and rendered more susceptible to further treatment.

Other objects of the invention and features of novelty will be apparent from the following description, taken in connection with the accompanying drawing, in which Figure 1 is a side elevation view of my improved feeder fitted to a coal pulverizer, certain parts of the feeder being broken away to more clearly disclose other parts.

Fig. 2 is a plan view of the feeder shown in Fig. 1, with the hopper removed, and Fig. 3 is a sectional view taken along the line 3—3 of Fig. 2.

Referring to the drawing, 10 indicates generally a feeder embodying my invention, while 11 indicates generally a coal pulverizer or other similar mechanism requiring a continuous supply of granular or powdered material. In this instance I have shown my improved feeder applied to a coal pulverizer similar in construction to that constituting the subject matter of my U. S. Patent No. 1,724,876.

Above the feeder is a hopper 12 or other receptacle adapted to receive a quantity of material, such as coal 14, which is to be fed. The feeder includes a chain conveyor which is enclosed in a substantially air tight housing. This housing is preferably constructed from sheet metal and is divided into upper and lower compartments. The upper compartment has two communicating chambers, one of which is adapted to hold a quantity of coal or other material, while the other has an opening through which air is admitted to the feeder. At the right hand end of the housing as viewed in Fig. 1, there is a portion 16, which is just large enough to enclose the end of the chain conveyor. Adjacent the portion 16 is a chamber 17, which leads from the hopper 12 and into which the material flows from the hopper. To the left of the chamber 17 is a narrower portion 18, while to the left of this portion is a wider and higher chamber 19, which has an opening 20 surrounded by the flange 21. A conduit to supply heated air to the feeder is connected to the opening 20. Adjacent the chamber 19 is the end portion 22, which is similar to the portion 16 which is located at the other end of the housing.

Within the housing is located a chain conveyor consisting of an endless chain 24 which extends through both compartments and which is supported on the sprockets 25 and 26. These sprockets are mounted on shafts 28 and 29, which in turn are supported by the bearing blocks 30 and 31. The chain is driven by one of the sprockets which may be driven by any suitable driving means, not shown, as by a motor or by a chain or belt connected to the pulverizer unit. The sprocket is driven so that the upper run of the chain moves from right to left, as viewed in Fig. 1.

The chain illustrated is constructed of a number of links composed of side bars 36 which are spaced apart by means of the cross bars 37. The links are flexibly secured together by means of pins so as to form an endless chain of relatively open construction. It should be understood, however, that this invention is not limited to any particular kind of chain, but that any one of many well known kinds of chain may be employed.

A plate 40, which extends across the housing and separates the upper and lower compartments, is placed immediately beneath the upper run of the chain. This plate extends the entire length of the chamber 17 and through the narrow portion 18, terminating in the chamber 19. A plate 42 is placed at the entrance to the portion 18. The plate 42 is fitted with a handle 43, and can be adjusted up and down, so as to vary the size of the opening leading from the chamber 17.

The bottom plate 45 of the feeder is just below the bottom run of the chain. An aperture or hole 46 is placed in the bottom plate and, as illustrated, this aperture is located directly below the hopper and extends the entire width of the housing. A baffle plate 48 is placed just to the right of the aperture 46. This plate extends from the plate 40 to a point just above the bottom run of the chain. It has been found that this plate is not necessary, however, in some installations.

In operation, coal or other material 14 to be fed is placed in the hopper 12. It then feeds by gravity through the chamber 17, and fills up the spaces in the links of the chain. The material is supported by the plate 40 which is below the chain, and when the chain is moved the material is carried along by the chain. The amount of material carried will be governed by the position of the member 42 which regulates the size of the opening leading from the chamber 17.

The material will be carried along by the chain until it reaches the end of the plate 40 which is within the chamber 19. When the material reaches the chamber 19 it will meet the blast of warm air which enters at 20. The air can be forced into the feeder by means of a blower, not shown, or it may be sucked into the feeder by the action of the mechanism which the feeder supplies. The air can, of course, be heated by any well known means, as by a coil in the furnace combustion chamber or in the flue. The heated air will dry the material so that it can be more readily pulverized or otherwise treated.

When the material reaches the end of the plate 40, it will fall through the spaces in the chain or over the sides of the chain and into the lower compartment. This will result largely from gravity, but the blast of air which enters at 20 will help loosen the material in case it sticks in the chain. As the material falls through the chain it will be agitated so that the heated air will come into intimate contact with substantially all of the material. This is important with wet substances which may be sticky or lumpy.

The material which falls through the upper run of the chain will drop onto the lower run of the chain and on the bottom plate 45. The lower run of the chain moves, of course, in the opposite direction from the upper run of the chain. The material will be carried along until it reaches the aperture 46, whence it will drop through this aperture to the device to be fed, in this case a coal pulverizer. The heated air which is introduced into the feeder also discharges through the aperture 46. The baffle 48 prevents the material travelling beyond the discharge opening. It has been found that this baffle is unnecessary unless the material fed is very wet.

From the foregoing it will be seen that my invention provides a feeding mechanism which will supply a steady and continuous supply of material. The chain positively carries the material through the feeder, while, at the same time, the amount carried is regulated by the quantity which will pass through the opening leading from the throat 17. As this quantity will be relatively constant with any given adjustment of the member 42, it will be seen that the rate of feed will be steady. By changing the position of the member 42 the rate of feed can, of course, be changed. It will be seen also that the feeder constructed according to my invention provides means by which heated air can be mixed with the material in the feeder so as to dry the material and render it more susceptible to further treatment, such for example as a pulverizing treatment.

The feeder provided by my invention is not limited to the handling of coal but is adapted to handle any other granular or powdered material. Neither is it limited to feeding a coal pulverizer, it being contemplated that the feeder can be used in connection with any device requiring a supply of granular or powdered material.

While I have illustrated and described in detail one construction embodying my invention, it should be understood that changes may be made thereto without departing from the spirit of the invention as defined in the appended claims.

Having thus described my invention, I claim:

1. A combined feeding and drying device comprising a housing having upper and lower compartments and a plate therebetween which forms the bottom of the upper compartment for supporting material to be fed and dried, said upper compartment comprising a hopper having a discharge opening at one side of the base thereof and said plate being extended beyond said opening and terminating with a free edge, said lower compartment having a bottom wall and an opening for the delivery of material therefrom, a chain conveyor arranged to traverse said plate and the bottom wall of said lower compartment, means for moving said chain across said plate and bottom wall whereby material is displaced from said plate over said free edge to drop by gravity through the chain onto the bottom wall of the lower compartment and is then displaced along said bottom wall and fed through the delivery opening by the chain, and means for causing a flow of heated air through the housing in contact with the material dropping into the lower compartment whereby moisture is removed from the material, said air flow means including a substantially vertically arranged supply conduit disposed above the free edge of said plate for directing the air downwardly substantially in line with the material falling from said free edge.

2. A combined feeding and drying device comprising a housing having upper and lower compartments and a plate therebetween which forms the bottom of the upper compartment for supporting material to be fed and dried, said upper compartment comprising a hopper having a discharge opening at one side of the base thereof and said plate being extended beyond said opening and terminating with a free edge, said lower compartment having a bottom wall and a delivery opening through said bottom wall at a point beneath said plate but offset laterally from said edge of the plate, a chain conveyor arranged to traverse said plate and the bottom wall of said lower compartment, means for moving said chain across said plate and bottom wall whereby material is displaced from said plate over said edge to drop by gravity through the chain onto the bottom wall of the lower compartment and is then displaced along said bottom wall and fed through said delivery opening by the chain, and means for supplying heated air to the housing at a point relatively remote from said delivery opening such that the air contacts with the material dropping into the lower compartment and with the material being displaced along said bottom wall, said air supply means including a substantially vertically arranged conduit disposed above the free edge of said plate for directing the air downwardly substantially in line with the material falling from said free edge.

AUSTIN A. HOLBECK.